United States Patent
Takhirov et al.

(10) Patent No.: US 11,017,542 B2
(45) Date of Patent: May 25, 2021

(54) SYSTEMS AND METHODS FOR DETERMINING DEPTH INFORMATION IN TWO-DIMENSIONAL IMAGES

(71) Applicant: DiDi Research America, LLC, Mountain View, CA (US)

(72) Inventors: Zafar Takhirov, Santa Clara, CA (US); Yun Jiang, Mountain View, CA (US)

(73) Assignee: BEIJING VOYAGER TECHNOLOGY CO., LD., Beijing (CN)

( * ) Notice: Subject to any disclaimer, the term of this patent is extended or adjusted under 35 U.S.C. 154(b) by 131 days.

(21) Appl. No.: 16/229,808

(22) Filed: Dec. 21, 2018

(65) Prior Publication Data

US 2020/0202542 A1    Jun. 25, 2020

(51) Int. Cl.

| | |
|---|---|
| *G06K 9/00* | (2006.01) |
| *G06T 7/50* | (2017.01) |
| *G06N 5/04* | (2006.01) |
| *G06K 9/46* | (2006.01) |

(52) U.S. Cl.
CPC .............. *G06T 7/50* (2017.01); *G06K 9/4604* (2013.01); *G06N 5/046* (2013.01); *G06T 2207/20081* (2013.01)

(58) Field of Classification Search
None
See application file for complete search history.

(56) References Cited

U.S. PATENT DOCUMENTS

2018/0061059 A1* 3/2018 Xu .......................... G06N 3/084
2018/0231871 A1    8/2018 Wang et al.

FOREIGN PATENT DOCUMENTS

| CN | 107274445 A | 10/2017 |
|---|---|---|
| CN | 108520535 A | 9/2018 |

OTHER PUBLICATIONS

Le, "Create 3D model from a single 2D image in PyTorch", published online Dec. 10, 2018 found at https://medium.com/vitalify-asia/create-3d-model-from-a-single-2d-image-in-pytorch-917aca00bb07 (Year: 2018).*
International Search Report issued in corresponding International Application No. PCT/US2018/067759, dated Apr. 2, 2019, 3 pages.
Written Opinion of the International Searching Authority issued in corresponding International Application No. PCT/US2018/067759, dated Apr. 2, 2019, 5 pages.

* cited by examiner

*Primary Examiner* — Soo Jin Park
(74) *Attorney, Agent, or Firm* — Bayes PLLC

(57) ABSTRACT

Embodiments of the disclosure provide systems and methods for determining depth information in a two-dimensional (2D) image. An exemplary system may include a processor and a non-transitory memory storing instructions that, when executed by the processor, cause the system to perform the various operations. The operations may include receiving a first feature map based on the 2D image and applying an extraction network having a convolution operation and a pooling operation to the first feature map to obtain a second feature map. The operations may also include applying a reconstruction network having a deconvolution operation to the second feature map to obtain a depth map.

20 Claims, 4 Drawing Sheets

SYSTEMS AND METHODS FOR DETERMINING DEPTH INFORMATION IN TWO-DIMENSIONAL IMAGES

TECHNICAL FIELD

The present disclosure relates to systems and methods for image recognition, and more particularly to systems and methods for determining depth information of two-dimensional images using convolutional neural networks.

BACKGROUND

In recent years, image recognition technologies have seen rapid growth in real world applications, from handwritten characters recognition to facial recognition and most recently in the industry of autonomous driving. Images in these applications are often highly complex for traditional computerized processings. Artificial neural networks that resemble the visual perception of living creatures have been employed to analyze visual imagery. However, due to the large amount of data being processed by fully connected neural networks consisting of multiple layers between the input and output layers, it becomes unfeasible for contemporary computers with limited computation capacity to perform such recognition on images that exceed a certain number of pixels, e.g., 32×32 pixels.

Consequently, a method called Convolutional Neural Network ("CNN") was proposed as a solution. CNNs use a variation of multilayer perceptrons to obtain representative features of an image. The multilayer perceptrons consist of three or more layers of nodes, including an input layer, one or more hidden layers, and an output layer. Except for the input layer, each node on the other layers is similar to a neuron in the animal visual cortex that responds to stimuli in a restricted region of a visual field. The hidden layers in CNNs are also known as convolutional layers when they apply a convolution operation to an input received from the input layer, just like the response of the individual neurons to stimuli. The convolution operation is able to reduce the amount of data being processed by the artificial intelligence neural networks and allows image recognition to be done by off-the-shelf computers.

For some applications in visual recognition, such as recognizing handwritten characters or numbers on car plates, depth information of objects in a two-dimensional (2D) image is of less concern, because, as long as the values of these characters or numbers can be obtained, it is unnecessary to know the distance of the characters or numbers in such an image. In addition, the characters or numbers in the image are normally not three-dimensional (3D) by themselves. However, in other applications where 3D objects are to be detected, such as autonomous driving, the depth information plays a more significant role. For example, when a self-driving vehicle spots a car in front of it, the relative position between the two is crucial for the vehicle to control traveling speed or direction, or to apply brakes. Although some self-driving vehicles use LiDAR scanners to measure distance and spatial relationship of an object, this inevitably leads to higher costs and cumbersome installation of a component only dedicated to a particular function.

To address the above problems, there is a need for more cost-effective systems and methods for determining depth information based on 2D images.

SUMMARY

In one aspect, embodiments of the disclosure provide a system for determining depth information in a two-dimensional (2D) image. The system may include at least one processor and at least one non-transitory memory storing instructions that, when executed by the processor, cause the system to perform the following operations: receiving a first feature map based on the 2D image; applying an extraction network having at least one convolution operation and at least one pooling operation to the first feature map to obtain a second feature map; and applying a reconstruction network having at least one deconvolution operation to the second feature map to obtain a depth map.

In another aspect, embodiments of the disclosure provide a method for determining depth information in a two-dimensional (2D) image. The method may include receiving a first feature map based on the 2D image. The method may further include applying an extraction network having at least one convolution operation and at least one pooling operation to the first feature map to obtain a second feature map, and applying a reconstruction network having at least one deconvolution operation to the second feature map to obtain a depth map.

In a further aspect, embodiments of the disclosure provide a non-transitory computer-readable medium having instructions stored thereon that, when executed by one or more processors, causes the one or more processors to perform operations. The operations may include receiving a first feature map based on the 2D image. The operations may further include applying an extraction network having at least one convolution operation and at least one pooling operation to the first feature map to obtain a second feature map, and applying a reconstruction network having at least one deconvolution operation to the second feature map to obtain a depth map.

It is to be understood that both the foregoing general description and the following detailed description are exemplary and explanatory only and are not restrictive of the invention, as claimed.

DETAILED DESCRIPTION

Reference will now be made in detail to the exemplary embodiments, examples of which are illustrated in the accompanying drawings. Wherever possible, the same reference numbers will be used throughout the drawings to refer to the same or like parts.

Figure 1:
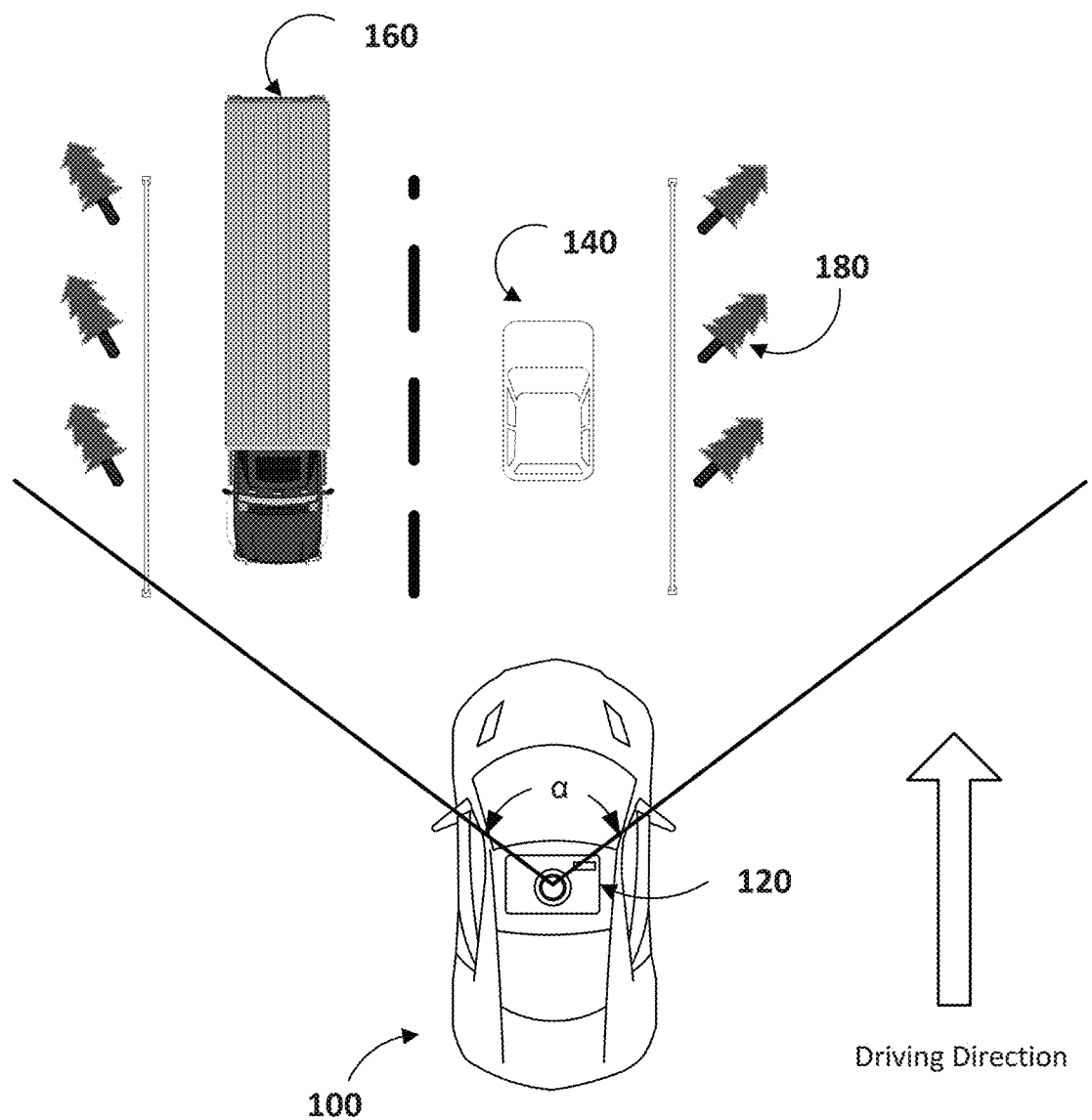
FIG. 1 illustrates a schematic diagram of an exemplary vehicle equipped with a depth information determination system traveling on a road with surrounding vehicles, consistent with some disclosed embodiments.

FIG. 1 illustrates a schematic diagram of an exemplary vehicle 100 equipped with a depth information determination system traveling on a road with surrounding vehicles. Although the following description uses autonomous driving as an implementation of the current disclosure, a person of ordinary skill in the art would know that the disclosure can be implemented on other scenarios where depth information of 2D images is desired—for example, facial recognition. Consistent with some embodiments, vehicle 100 may be a car capable of autonomous driving. It is contemplated that vehicle 100 may be an electric vehicle, a fuel cell vehicle, a hybrid vehicle, or a conventional internal combustion engine vehicle. Vehicle 100 may have a body and at least one wheel. The body may be of any body style, such as a toy car, a motorcycle, a sports vehicle, a coupe, a convertible, a sedan, a pick-up truck, a station wagon, a sports utility vehicle (SUV), a minivan, a conversion van, a multi-purpose vehicle (MPV), or a semi-trailer truck. In some embodiments, vehicle 100 may include a pair of front wheels and a pair of rear wheels. However, it is contemplated that vehicle 100 may have less or more wheels or equivalent structures that enable itself to move around. Vehicle 100 may be configured to be all wheel drive (AWD), front wheel drive (FWR), or rear wheel drive (RWD). In some embodiments, vehicle 100 may be configured to be operated by an operator occupying the vehicle, remotely controlled, and/or autonomous.

As illustrated in FIG. 1, vehicle 100 may be equipped with an image capturing component 120. In some embodiments, the image capturing component 120 may be an image sensor or other types of sensor that are capable of capturing still images (e.g. photos) or motion images (e.g. videos). The image capturing component 120 may be integrated into a camera installed in or on vehicle 100. Alternatively, it can also be a part of a digital device placed in or on vehicle 100, such as a mobile phone, a laptop, a PDA, a navigation device, etc. The captured images may be transmitted for further processing by a system disclosed herein, which will be further discussed below.

When traveling on the road, as illustrated in FIG. 1, the image capturing component 120 of vehicle 100 may capture images within a field of view ("FOV"), which is defined by the focal length of the camera housing image capturing component 120 and the size of the image sensor. For a 2D image capturing component 120, the FOV can be represented by horizontal and vertical angles of view. These angles of view α (horizontal) and β (vertical) can be of any value between 0 and 360 degrees. As vehicle 100 moves along a trajectory, digital images with respect to a scene (e.g., including objects surrounding vehicle 100) can be acquired by image capturing component 120. Each image may include textual information of the objects in the captured image represented by pixels. Each pixel may be the smallest single component of a digital image that is associated with color information and coordinates in the image.

For autonomous driving, vehicle 100 often needs to recognize from the cluster of pixels not only what objects are in the image, but also the depth information of these objects in the image. The present disclosure provides technical solutions to determination of the depth information.

Figure 2:
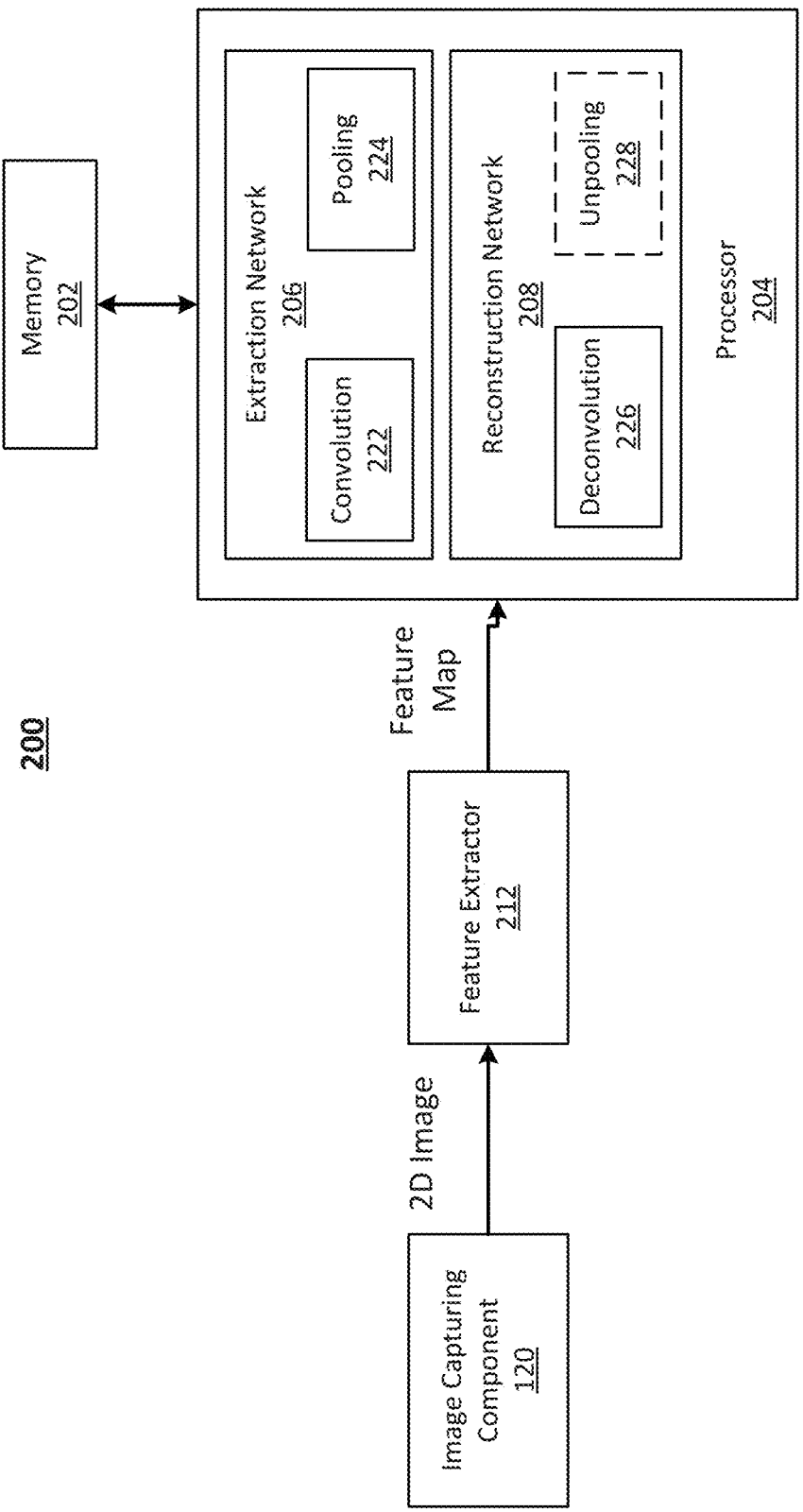
FIG. 2 illustrates a block diagram of an exemplary system for determining depth information of one or more objects in 2D images, consistent with some disclosed embodiments.

FIG. 2 illustrates a block diagram of an exemplary system 200 for determining the depth information of one or more objects in 2D images. System 200 may include a memory 202 configured to store one or more computer instructions that, when executed by at least one processor, can cause system 200 to perform various operations disclosed herein. Memory 202 may be any non-transitory type of mass storage, such as volatile or non-volatile, magnetic, semiconductor-based, tape-based, optical, removable, non-removable, or other type of storage device or tangible computer-readable medium including, but not limited to, a ROM, a flash memory, a dynamic RAM, and a static RAM.

System 200 may further include a processor 204 capable of performing the operations in accordance with the instructions stored in memory 202. Processor 204 may include any appropriate type of general-purpose or special-purpose microprocessor, digital signal processor, or microcontroller. Processor 204 may be configured as a separate processor module dedicated to performing one or more specific operations. Alternatively, processor 204 may be configured as a shared processor module for performing other operations unrelated to the one or more specific operations disclosed herein. As shown in FIG. 2, processor 204 may include multiple modules, such as a module for an extraction network 206, a module for a reconstruction network 208, and the like. These modules (and any corresponding sub-modules or sub-units) can be hardware units (e.g., portions of an integrated circuit) of processor 204 designed for use with other components or to execute a part of a program. Although FIG. 2 shows modules 206 and 208 all within one processor 204, it is contemplated that these modules may be distributed among multiple processors located close to or remotely with each other.

In some embodiments, system 200 may further include image capturing component 120, the structure and function of which have been described above. Image capturing component 120 outputs 2D images. The images can be a single shot of still image (photo), or a stream of motion images (a video stream) consisting of multiple frames. The present disclosure is applicable to both still and motion images, as the operations disclosed herein can be performed on each of the images/frames and its feature map input to system 200.

In some embodiments, system 200 may further include a feature extractor 212. Feature extractor 212 may extract at least one feature of a 2D image (e.g., received from image capturing component 120) and form a feature map to be sent to processor 204, as illustrated in FIG. 2. The extraction and formation can be achieved by a CNN architecture. In particular, the CNN architecture is made of multiple layers, including an input layer, one or more hidden layers, and an output layer. The hidden layer(s) may apply a convolutional operation to the 2D image to extract features, such as lines, edges, curves, circles, squares, corners, or textures. Such a convolutional layer includes at least one trainable filter (also known as a kernel) replicated across the entire visual field. The parameters in the filter include a weight vector and a bias. Therefore, by applying the filter to the image, an output of a feature map representing the specific feature(s) extracted by the filter can be obtained. Also, because a CNN architecture uses the same filter across all visual fields of a particular layer, the memory footprint, i.e., the amount of main memory that a program uses or references while running, is significantly reduced as compared to fully connected neural networks. A convolution equation, for example, can be represented by Eq. 1 below:

$$Z^{l+1}(i, j) = [Z^l \otimes w^l](i, j) + b = \sum_{k=1}^{K_l} \sum_{x=1}^{f} \sum_{y=1}^{f} [Z_k^l(s_0 i + x, s_0 j + y) w_k^{l+1}(x, y)] + b \qquad \text{Eq. 1}$$

$$(i, j) \in \{0, 1, \ldots L_{l+1}\}$$
$$L_{l+1} = \frac{L_l + 2p - f}{s_0} + 1.$$

In Eq. 1, b is the bias, $Z^l$ and $Z^{l+1}$ respectively represent the input and output of the (l+1)th convolutional layer, i.e., feature map. $L_{l+1}$ is the volume size of $Z^{l+1}$, assuming the feature map is square. $Z(i,j)$ corresponds to each pixel of the feature map, with i and j each identifying the row and column positions of the pixel. K is the channel number of feature maps, while f, $s_0$, and p respectively represent the kernel field size, stride, and the amount of zero padding applied to the convolutional layer. These parameters of Eq. 1 can be adjusted in order for the CNN architecture to extract different features of a given image, and the adjustment may be optimized by training the CNN architecture with a training dataset.

Consistent with some embodiments of the present disclosure, feature extractor 212 may employ CNNs developed by Oxford Visual Geometry Group ("VGG networks"). The VGG networks use an architecture with very small convolutional filters (3×3) with two different depth models, specifically a 16-layer model and a 19-layer model. The VGG networks are very useful both as image classifiers and as the basis for developing new CNN models, and may be well generalized and applied to different datasets. In other embodiments, feature extractor 212 may also use other types of CNNs, such as ZFNet, GoogleNet, ResNet, etc.

Upon receiving a first feature map based on the 2D image (e.g., a feature map provided by feature extractor 212), the system according to the present disclosure invokes one or more instructions stored in memory 202, and causes processor 204 to apply an extraction network to the first feature map to obtain a second feature map. As illustrated in FIG. 2 and discussed above, processor 204 may include a module for extraction network 206. In some embodiments, module 206 further has a convolution module 222 and a pooling module 224.

The convolution module 222 may apply one or more convolution filters to the first feature map so that more features of the input 2D image are extracted and a new feature map is output after each such convolutional processing. The multiple feature maps may each focus on different, specific features in the 2D image. For example, the first feature map may only be responsive to lines in the 2D image because the first convolution filter is trained to detect lines; the second feature map may only be responsive to circles for similar reasons. A person of ordinary skill in the art would understand that other features can be extracted using state-of-the-art CNN architectures. Alternatively, one can also self-train the weights and other parameters of the CNN filter using the data commonly available in the scenarios where the system will be implemented. This may require a large amount of training data in order to avoid overfitting, which means the outcome of the training may be overly dependent on a particular set of data and therefore may lack reliability of predicting future observations based on a different set of data.

The pooling module 224 is designed to decrease the amount of data transmitted and processed in the cascade of layers. A pooling operation combines the outputs of a cluster of nodes in one layer into a single node in the next layer. In other words, pooling down-samples the data along the output path of the CNNs. For example, for four nodes in a 2×2 configuration in layer l, they can be combined and mapped to one node in layer l+1. There are two different pooling methods. One is called max-pooling, under which the largest value in the four nodes is kept for the node of the next layer while the other three are discarded. Max-pooling is good at preserving background information of the image. Another is called mean-pooling or average-pooling, under which the average value of the four nodes is used as the value of the node of the next layer. Mean-pooling tends to keep the texture information of the image.

According to the present disclosure, as more layers of convolution filters are applied to the input image, the size of the feature map becomes smaller and the depth of the feature maps is increased. After each layer of the CNNs, processor 204 obtains intermediate results of the convolution and pooling operations, which are also in the forms of feature maps and will be used to reconstruct, for example, the depth information. Therefore, the intermediate feature maps and the output feature map of extraction network 206 is smaller than the original feature map it receives, for example, from feature extractor 212.

As illustrated in FIG. 2 and discussed above, processor 204 may also include a module for reconstruction network 208. In some embodiments, module 208 further has a deconvolution module 226. The deconvolution module 226 is designed to apply a deconvolution operation to the intermediate results to obtain the depth information. Deconvolution, as the name suggests, is a reverse operation to convolution. Similar to the convolution operation, deconvolution may also use state-of-the-art types of CNNs, or may be trained with a training dataset. Deconvolution augments the scale of the input by linking one node of layer l' to multiple nodes of layer l'+1 (for example, 3×3 nodes). As a result, the angular resolution (also known as spatial resolution) of the intermediate feature maps can be improved. Angular resolution describes the ability of an image capturing component to distinguish small details of an object, and is a major determinant of image resolution. At the end of one or more deconvolution operations, a depth map of the received 2D image is output from the reconstruction network module 208.

In some embodiments, module 208 may optionally include an unpooling module 228. Unpooling is a reverse operation to pooling. It up-samples the input data to get the prediction map that is the same size of the input map. For example, the unpooling operation may expand one down-sampled node of the previous layer to a 2×2 cluster of nodes of the layer being unpooled by assigning the value of that node to one of the four nodes and padding the other nodes with zeros.

Figure 3:
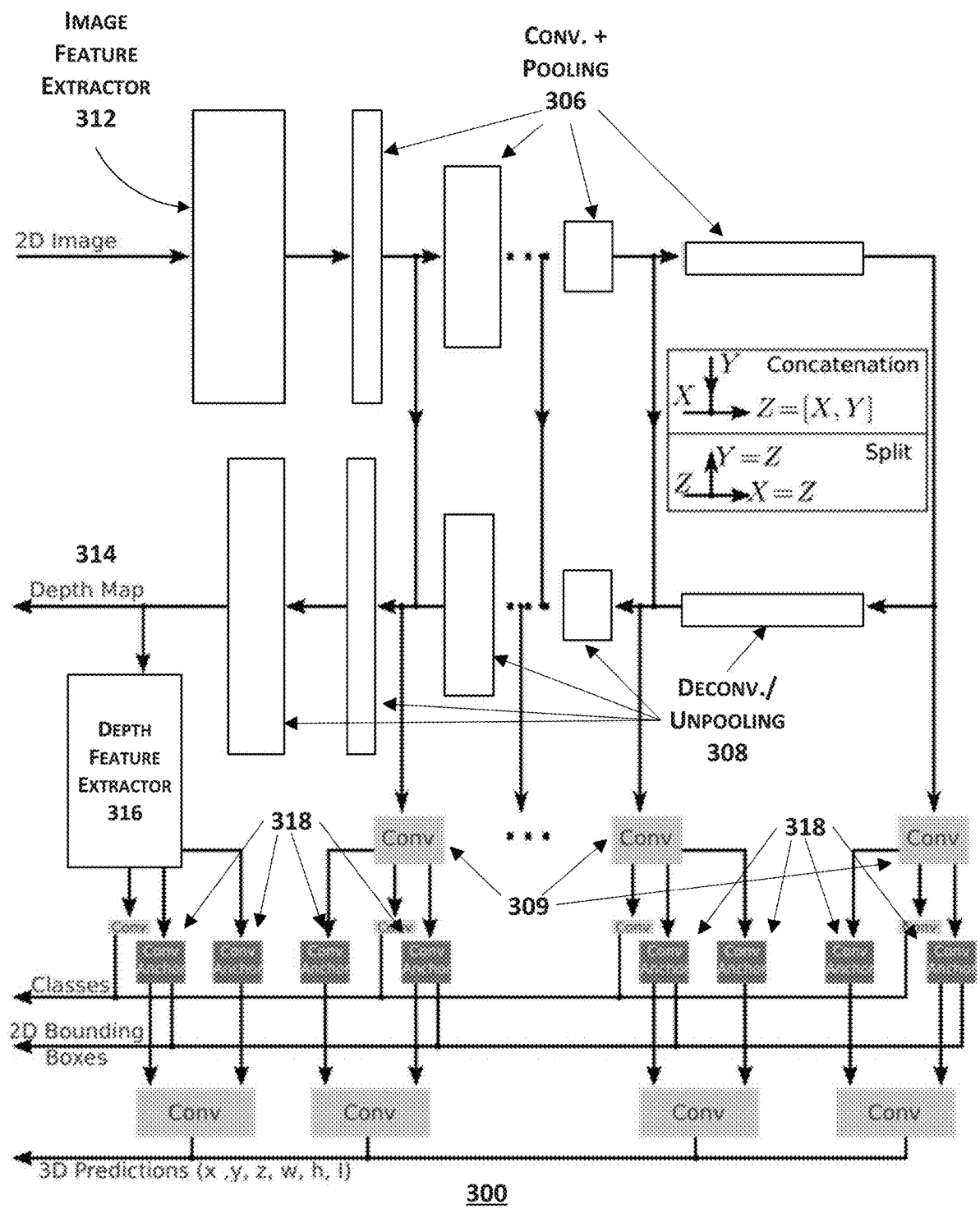
FIG. 3 illustrates a block diagram of an exemplary system for determining depth information, classes, bounding boxes, and 3D parameters of one or more objects in 2D images, consistent with some disclosed embodiments.

FIG. 3 illustrates a block diagram of an exemplary system 300 for determining information such as the depth information, classes, bounding boxes, and 3D parameters of one or more objects in 2D images. System 300 has several distinctive modules, including an image feature extractor 312, an extraction network 306 having a plurality of layers, each comprising a convolution operation and a pooling operation, a reconstruction network 308 having a plurality of layers, each comprising a deconvolution operation and an optional unpooling operation. These layers may be within one processor or distributed among multiple processors located close to or remotely with each other, each of which is capable of performing the operations in accordance with instructions stored in a memory (e.g., memory 202).

The convolution operation, the pooling operation, the deconvolution operation, and the unpooling performed within system 300 may adopt the same underlying algorithms as those operations disclosed in connection with system 200, the details of which will not be repeated here.

In some embodiments, image feature extractor 312 may be configured to extract a feature from an input 2D image to generate a feature map. Operations performed by image feature extractor 312 for extracting a feature and generating the feature map may be similar to those of feature extractor 212, the details of which will not be repeated here.

As illustrated in FIG. 3 and similar to system 200, system 300 is also capable of acquiring a depth map 314 of the received 2D image using the intermediate results of the convolution and pooling operations performed within the plural layers of extraction network 306. After being input to the first layer next to image feature extractor 312, the feature map output from image feature extractor 312 undergoes a series of CNN operations sequentially through multiple layers of network 306, with the arrows in FIG. 3 indicating the operation sequence. In some embodiments, each layer may perform at least one convolution operation and a pooling operation on the received feature map from its immediately previous layer to obtain another feature map of the 2D image, that is, an intermediate result of the CNN operations. In some embodiments, multiple convolution operations may be performed within a layer, followed by a pooling operation. At the conjunction between two adjacent layers, system 300 may further perform a split operation that separates one single data path Z into two different paths, X and Y. By such a split operation, the intermediate result output from each layer may be diverted into two destinations—the next layer in extraction network 306 and the corresponding layer in reconstruction network 308, as shown in FIG. 3.

The reconstruction network 308 receives the final output of the extraction network 306 from the last layer of extraction network 306, which is also a feature map of the 2D image. As schematically shown in FIG. 3, the size of the feature map (indicated by the height of the blocks 306) at this stage is significantly reduced, while the depth of the feature map (indicated by the width of the blocks 306) is significantly increased. In other words, extraction network 306 converts a pixel-heavy 2D image (in which features are embedded) into a feature-rich set, in which essential information of the original 2D image is represented by a series of features, each of them is relatively condensed. Subsequently, multiple layers in network 308 sequentially perform deconvolution operations on the received feature map, with the arrows indicating the operation sequence. Beginning from the second layer right after the input layer of network 308, each layer performs a concatenation operation of two distinct inputs, one being the intermediate result from the immediately previous layer and the other being the intermediate result from the corresponding layer split from the extraction network 306, as shown in FIG. 3. Concatenation is a combination of two data paths X and Y into one path Z. Thereafter, a deconvolution operation is performed on the concatenated data in order to output another intermediate result for the next layer. At the end of the reconstruction network 308, a depth map 314 is obtained.

In other embodiments, one or more layers of reconstruction network 308 may optionally include an unpooling operation. As discussed above, unpooling is a reverse operation to pooling. It up-samples the input data to get the prediction map that is the same size of the input map. For example, the unpooling operation may expand one down-sampled node of the previous layer to a 2×2 cluster of nodes of the layer being unpooled by assigning the value of that node to one of the four nodes and padding the other nodes with zeros. It is noted that this is only one specific example of unpooling and a person of ordinary skill in the art would utilize other ways to up-sample the nodes while achieving the same purpose of the present disclosure.

Consistent with some embodiments of the present disclosure, system 300 can be further configured to produce predictions for classes and 2D bounding box estimation. Object classification is a key advantage of CNNs over traditional computer vision methods, which allows the computer to categorize images into different sets of classes. In the realm of autonomous driving, for example, a well-trained CNN architecture should be able to determine which class an object in the 2D image most probably belongs to, such as a car, a bus, a truck, a bicycle, a pedestrian, a cat, a dog, a tree, or something else, thereby enabling the self-driving vehicle to respond to the surrounding environment more accurately and intuitively. Thus, the accuracy of object classification has become an important factor in selecting the CNN architecture.

According to the present disclosure, system 300 may be further configured to localize the classification of objects, for example, by breaking an image into a grid of cells and making predictions for each cell separately. Further facilitated by 2D bounding boxes, system 300 can be configured to classify multiple objects in one single cell. For example, as illustrated in FIG. 1, vehicle 100, equipped with system 300 according to the present disclosure, may distinguish car 140 from truck 160, and may also recognize trees 180 along the traveling trajectory.

To achieve this, system 300 is provided with one or more convolution modules 309 that apply a convolution operation to the intermediate results split from the extraction network 306 and the reconstruction network 308, as shown in FIG. 3. Each module 309 may be designed to be responsive to only one cell of the feature map passing therethrough, therefore focusing its prediction on that particular cell of the 2D image. The output of each module 309 can be referred to as a "preprocessor." The number of preprocessors $N_p$ corresponds to the number of modules 309. The larger the number of preprocessors, the more details of the image that modules 309 may acquire from the intermediate results from the extraction and reconstruction networks. However, larger number of preprocessors may burden the computation capacity and slow down system 300. Another consideration for designing $N_p$ and the cell size $S_c$ for system 300 is that the product of $N_p$ and $S_c$ is preferably no smaller than the total size of the 2D image $S_t$, as expressed in Eq. 2 below:

$$N_p \times S_c \geq S_t. \qquad \text{Eq. 2}$$

In this way, there would be no pixel in the 2D image whose classification is unaccounted for. After obtaining the preprocessors, system 300 may perform a concatenation operation on part or all of the preprocessors to produce predictions for classes of multiple objects in one or more cells of the 2D image.

Consistent with embodiments of the present disclosure, system 300 may be further provided with one or more convolution anchor boxes 318 to facilitate the prediction of multiple objects in cells. A convolution anchor box is a box with pre-defined shape, such as a rectangular, a square, etc. By applying multiple anchor boxes to the preprocessors, system 300 is able to obtain 2D bounding boxes that are similar in size to the objects to be recognized in the cells of the 2D image. The more anchor boxes are used upon the concatenated preprocessors, the better estimation can be made with respect to the locations and sizes of the 2D bounding boxes, which can be used for subsequent determination of objects in one or more cells of the 2D image.

At the prediction stage, the concatenated preprocessors may be further concatenated with a depth feature map generated by a depth feature extractor 316 to obtain better results of object classification, 2D bounding boxes, and 3D predictions. Unlike image feature extractor 312 that extracts features from the 2D image, depth feature extractor 316 extracts features from depth map 314. Therefore, CNN architectures that are trained on images, such as VGG networks, are less preferable than those trained on depth maps. Such depth-map-based CNN architectures may be developed by backpropagation, a method commonly used to calculate a gradient essential to the calculation of weights of a CNN filter. Alternatively, depth-map-based CNN architectures may also be trained with LiDAR data. For example, one may interpolate the depth map from the LiDAR data, since LiDAR is a well-known device that acquires depth information of an imaging field by measuring distance to a target with pulsed laser light.

According to some embodiments of the present disclosure, system 300 may be further configured to estimate 3D parameters of the objects in the 2D image. The 3D parameters may include x, y, and z, which indicate the location of a point in a 3D coordinate system. In addition, the 3D size of the objects is represented by w (width), h (height), and l (length). These parameters of the objects in the 2D image can be further estimated using another CNN architecture that convolutes the intermediate feature maps from extraction network 306, intermediate feature maps from reconstruction network 308, and predictions of the class(es) and 2D bounding box(es) of the objects obtained from the preceding prediction stages.

Occasionally, a CNN-based system may detect a single object in a 2D image for multiple times, therefore causing redundancy in data output or sometimes inaccurate information. In order to reduce such occurrence, system 300 according to the present disclosure may be further provided a non-maximum suppression operation, by which the redundant or inaccurate detection of the objects are filtered out. For example, the operation first identifies the bounding box with the largest probability of the object. Then, the surrounding bounding boxes identified to have the same object that overlaps with the first identified bounding box will be searched and suppressed. Thus, the bounding box with the largest probability of the object remains and becomes the only prediction of that object in the 2D image.

Figure 4:
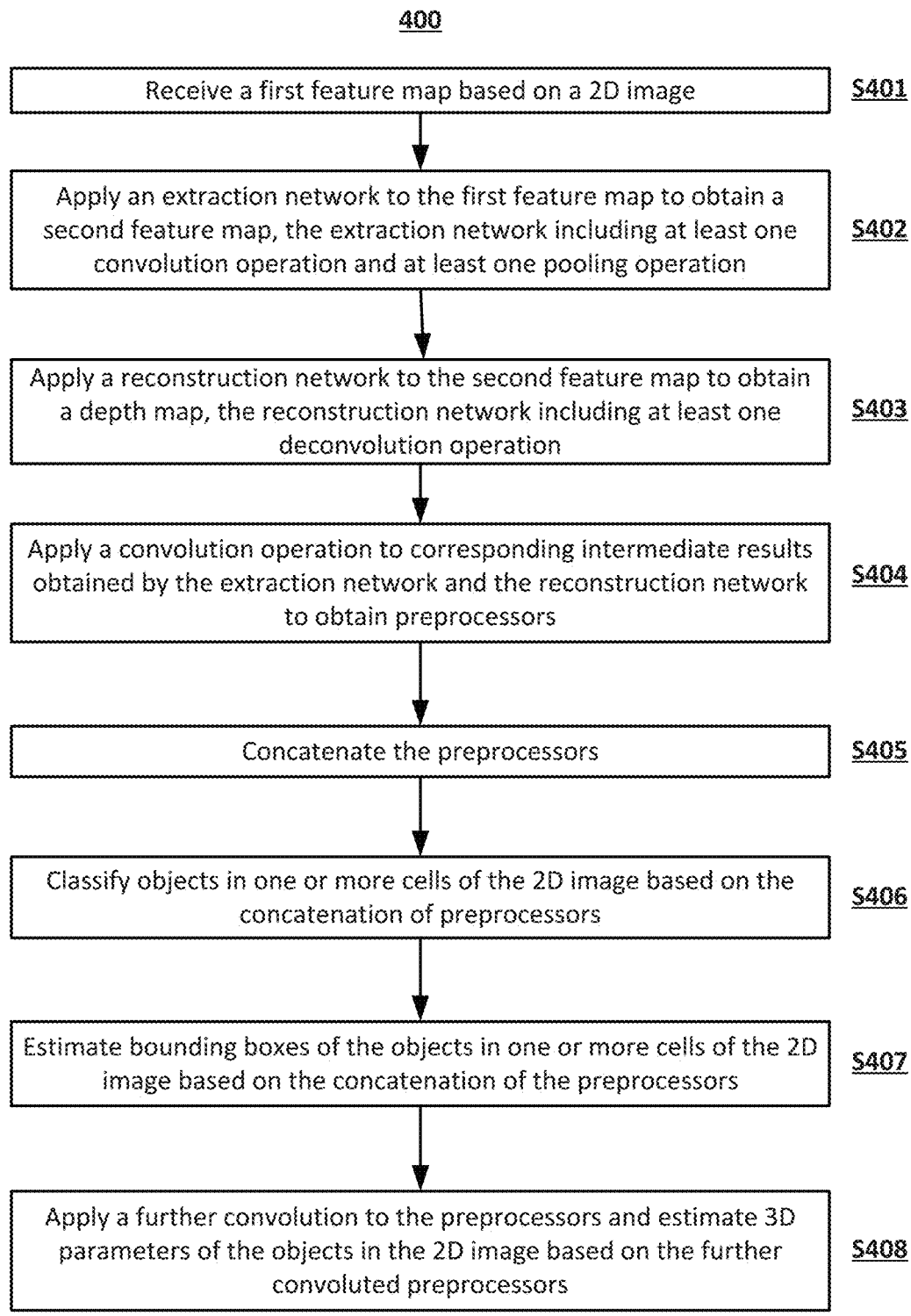
FIG. 4 illustrates a flowchart of an exemplary method for determining depth information based on 2D images using CNNs.

FIG. 4 illustrates a flowchart of an exemplary method 400 for determining depth information of 2D images using CNNs. In some embodiments, method 400 may be implemented by system 200 that includes, among other things, a memory 202 and a processor 204 that performs various operations under extraction network 206 and reconstruction network 208. For example, step S402 of method 400 may be performed by convolution module 222 and pooling module 224, and step S403 may be performed by deconvolution module 226. In other embodiments, method 400 may be implemented by system 300 that includes, among other things, one or more of modules selected from an image feature extractor 312, a depth feature extractor 316, an extraction network 306 having a plurality of layers, a reconstruction network 308 having a plurality of layers, one or more convolution modules 309, and one or more convolution anchor boxes 318. It is to be appreciated that some of the steps may be optional to perform the disclosure provided herein, and that some steps may be inserted in the flowchart of method 400 that are consistent with other embodiments according to the current disclosure. Further, some of the steps may be performed simultaneously, or in an order different from that shown in FIG. 4.

In step S401, a depth information determination system such as system 200 may receive a first feature map based on a 2D image. The 2D image may be captured by an image capturing component 120 that may or may not be part of system 200. The captured image may pass through a feature extractor 212 that may or may not part of system 200. Feature extractor 212 may extract at least one feature of the 2D image and form a feature map using a CNN architecture.

In step S402, upon receiving a first feature map based on the 2D image, system 200 invokes one or more instructions stored in memory 202, and causes processor 204 to apply an extraction network to the first feature map to obtain a second feature map. Processor 204 includes a module for extraction network 206, which further has a convolution module 222 and a pooling module 224. The two modules respectively apply at least one convolution operation and at least one pooling operation to the first feature map, as discussed above.

In step S403, system 200 further invokes one or more instructions stored in memory 202, and causes processor 204 to apply a reconstruction network to the second feature map to obtain a depth map. Processor 204 includes a module for reconstruction network 208, which further has a deconvolution module 226. The deconvolution module applies at least one deconvolution operation to the second feature map, as discussed above.

In step S404, as previously explained in conjunction with system 300, when the extraction and reconstruction networks each include a plurality of layers (e.g., networks 306 and 308), the output of that layer upon convolution/pooling/deconvolution operations, as the case may be, becomes intermediate results in the form of feature maps that are further provided to one or more convolution modules 309. Each module 309 may be designed to be responsive to only one cell of the feature map passing therethrough, therefore focusing its prediction on that particular cell of the 2D image. The output of each module 309 is referred to as a "preprocessor." The convolution modules 309 apply a convolution operation to the corresponding intermediate results to obtain preprocessors.

In step S405, the preprocessors may be concatenated for further processing by system 300.

In step S406, based on the concatenation of the preprocessors, system 300 may further perform an operation to classify objects in one or more cells of the 2D image.

In step S407, based on the concatenation of the preprocessors, system 300 may further estimate bounding boxes of the objects in one or more cells of the 2D image.

In step S408, system 300 may apply a further convolution to the preprocessors, which convolutes the intermediate feature maps from the extraction network 306, intermediate feature maps from the reconstruction network 308, and predictions of the class(es) and 2D bounding box(es) of the objects obtained from the previous steps. Thereby, 3D parameters of the objects in the 2D image may be estimated based on the further convoluted preprocessors.

Another aspect of the disclosure is directed to a non-transitory computer-readable medium storing instructions which, when executed, cause one or more processors to perform the methods, as discussed above. The computer-readable medium may include volatile or non-volatile, magnetic, semiconductor, tape, optical, removable, non-removable, or other types of computer-readable medium or computer-readable storage devices. For example, the computer-readable medium may be the storage device or the memory module having the computer instructions stored thereon, as disclosed. In some embodiments, the computer-readable medium may be a disc, a flash drive, or a solid-state drive having the computer instructions stored thereon.

Systems and methods according to the current disclosure has an advantage of determining depth information based on 2D images using convolutional neural networks, without the need for a distance measuring device, such as a LiDAR.

Furthermore, the systems and methods may simultaneously perform two or more of the following operations on a 2D image—determining the depth information of the image, classifying the objects in the image, estimating bounding boxes of the objects in subdivided cells of the image, and estimating 3D parameters of the objects in the image—which is not known in the industry. Depending on particular applications, one or more of these operations may be selectively implemented in a system.

It will be apparent to those skilled in the art that various modifications and variations can be made to the disclosed system and related methods. Other embodiments will be apparent to those skilled in the art from consideration of the specification and practice of the disclosed system and related methods.

It is intended that the specification and examples be considered as exemplary only, with a true scope being indicated by the following claims and their equivalents.

What is claimed is:

1. A system for determining depth information in a two-dimensional (2D) image, comprising:
    at least one processor; and
    at least one non-transitory memory storing instructions that, when executed by the at least one processor, cause the system to perform operations comprising:
        receiving a first feature map based on the 2D image;
        applying an extraction network comprising at least one convolution operation and at least one pooling operation to the first feature map to obtain a second feature map; and
        applying a reconstruction network comprising at least one deconvolution operation and at least one unpooling operation to the second feature map, wherein an output of the deconvolution operation and the unpooling operation is a 3D depth map.

2. The system of claim 1, comprising an image capturing component configured to capture the 2D image.

3. The system of claim 1, comprising a feature extractor configured to extract at least one feature from the 2D image to generate the first feature map.

4. The system of claim 1, wherein features in the first or second feature map include at least one of lines, edges, curves, circles, squares, corners, or texture.

5. The system of claim 1, wherein:
    the extraction network comprises a plurality of layers, each layer comprising at least one convolution operation and one pooling operation; and
    wherein the operations comprise:
        applying the plurality of layers of the extraction network to the first feature map sequentially to obtain intermediate results after each of the plurality of layers.

6. The system of claim 5, wherein:
    the reconstruction network comprises a plurality of layers, each layer comprising at least one deconvolution operation; and
    where the operations comprise:
        applying the plurality of layers of the reconstruction network to the second feature map sequentially to obtain intermediate results after each of the plurality of layers.

7. The system of claim 6, wherein the operations comprise:
    applying a convolution operation to the corresponding intermediate results obtained by the extraction network and the reconstruction network to obtain preprocessors; and
    concatenating multiple preprocessors.

8. The system of claim 7, wherein the operations comprise:
    classifying objects in one or more cells of the 2D image based on the concatenation of the preprocessors.

9. The system of claim 7, wherein the operations comprise:
    estimating bounding boxes of objects in one or more cells of the 2D image based on the concatenation of the preprocessors.

10. The system of claim 7, wherein the operations comprise:
    applying a further convolution operation to the preprocessors; and
    estimating 3D parameters of objects in the 2D image based on the further convoluted preprocessors.

11. The system of claim 1, wherein the operations comprise:
    training the extraction network and the reconstruction network using a training dataset.

12. The system of claim 1, wherein a dimension of the second feature map is smaller than a dimension of the first feature map.

13. A method for determining depth information in a two-dimensional (2D) image, comprising:
    receiving, from a feature extractor, a first feature map based on the 2D image;
    applying, by a processor, an extraction network comprising at least one convolution operation and at least one pooling operation to the first feature map to obtain a second feature map; and
    applying, by the processor, a reconstruction network comprising at least one deconvolution operation and at least one unpooling operation to the second feature map, wherein an output of the deconvolution operation and the unpooling operation is a 3D depth map.

14. The method of claim 13, wherein:
    the extraction network comprises a plurality of layers, each layer comprising at least one convolution operation and one pooling operation;
    the reconstruction network comprises a plurality of layers, each layer comprising at least one deconvolution operation; and
    the method further comprises:
        applying, by the processor, the plurality of layers of the extraction network to the first feature map sequentially to obtain intermediate results after each of the plurality of layers;
        applying, by the processor, the plurality of layers of the reconstruction network to the second feature map sequentially to obtain intermediate results after each of the plurality of layers;
        applying, by the processor, a convolution operation to the corresponding intermediate results obtained by the extraction network and the reconstruction network to obtain preprocessors; and
        concatenating, by the processor, multiple preprocessors.

15. The method of claim 14, further comprising:
    classifying, by the processor, objects in one or more cells of the 2D image based on the concatenation of the preprocessors.

16. The method of claim 14, further comprising:
    estimating, by the processor, bounding boxes of objects in one or more cells of the 2D image based on the concatenation of the preprocessors.

17. The method of claim 14, further comprising:
applying, by the processor, a further convolution operation to the preprocessors; and
estimating, by the processor, 3D parameters of objects in the 2D image based on the further convoluted preprocessors.

18. The method of claim 13, further comprising:
training the extraction network and the reconstruction network using a training dataset.

19. The method of claim 13, wherein a dimension of the second feature map is smaller than a dimension of the first feature map.

20. A non-transitory computer-readable medium having instructions stored thereon that, when executed by one or more processors, causes the one or more processors to perform a method for determining depth information in a two-dimensional (2D) image, the method comprising:
receiving, from a feature extractor, a first feature map based on the 2D image;
applying, by the one or more processors, an extraction network comprising at least one convolution operation and at least one pooling operation to the first feature map to obtain a second feature map; and
applying, by the one or more processors, a reconstruction network comprising at least one deconvolution operation and at least one unpooling operation to the second feature map, wherein an output of the deconvolution operation and the unpooling operation is a 3D depth map.

* * * * *